United States Patent [19]

Buja et al.

[11] Patent Number: 4,767,579
[45] Date of Patent: Aug. 30, 1988

[54] METHOD OF PRECISION VOLUMETRIC CONTROL OF A MOLDABLE MATERIAL IN AN INJECTION MOLDING PROCESS

[75] Inventors: Frederick J. Buja, Rochester; Alan B. Miller, Scottsville; William H. Sherwood, Victor; James J. Wenskus, Jr., Rochester, all of N.Y.

[73] Assignee: Eastman Kodak Company, Rochester, N.Y.

[21] Appl. No.: 115,675

[22] Filed: Nov. 2, 1987

[51] Int. Cl.⁴ ............................................. B29C 45/57
[52] U.S. Cl. ................................ 264/40.5; 264/328.1; 425/138; 425/150
[58] Field of Search ............... 364/474, 476; 264/40.1, 264/40.3, 40.4, 40.5, 40.7, 328.1, 328.11; 425/135, 136, 137, 138, 140, 145, 146, 147, 149, 150, 162, 167, 543

[56] References Cited

U.S. PATENT DOCUMENTS

| 3,940,465 | 2/1976 | Hauser et al. | 264/40.5 |
| 4,038,004 | 7/1977 | Hartmann | 425/150 |
| 4,710,119 | 12/1987 | Otake | 425/150 |

FOREIGN PATENT DOCUMENTS

| 60-139421 | 7/1985 | Japan | 425/150 |
| 60-242025 | 12/1985 | Japan | 264/40.5 |

Primary Examiner—Jan H. Silbaugh
Assistant Examiner—Jill L. Fortenberry
Attorney, Agent, or Firm—Robert L. Randall

[57] ABSTRACT

A method of operating an injection molding machine having a pair of separable mold elements forming a mold cavity therebetween with means for opening and closing the mold elements with means for introducing a moldable material into the mold cavity at a first pressure and for exerting a second pressure on the moldable material as it cures in the cavity. The method controls the molded product and comprises the steps of closing the mold elements and introducing a moldable material into the mold cavity. The separation of the mold elements is measured during the injection of the moldable material and a predetermined separation of the mold elements is detected. Upon detecting the predetermined separation the pressure is changed from the first pressure to the second pressure and the separation of the mold elements is continued. Measurement of mold element separation is continued and the cessation of the increase in the separation of the mold elements is detected. A determination is made whether or not the cessation occurs within a predetermined separation window. If the cessation is not within the window a signal is generated to indicate that the cycle has exceeded the product limit. If the cessation is within the window then the cycle is continued and the second pressure is maintained until the moldable material has cured. The mold is then opened.

8 Claims, 8 Drawing Sheets

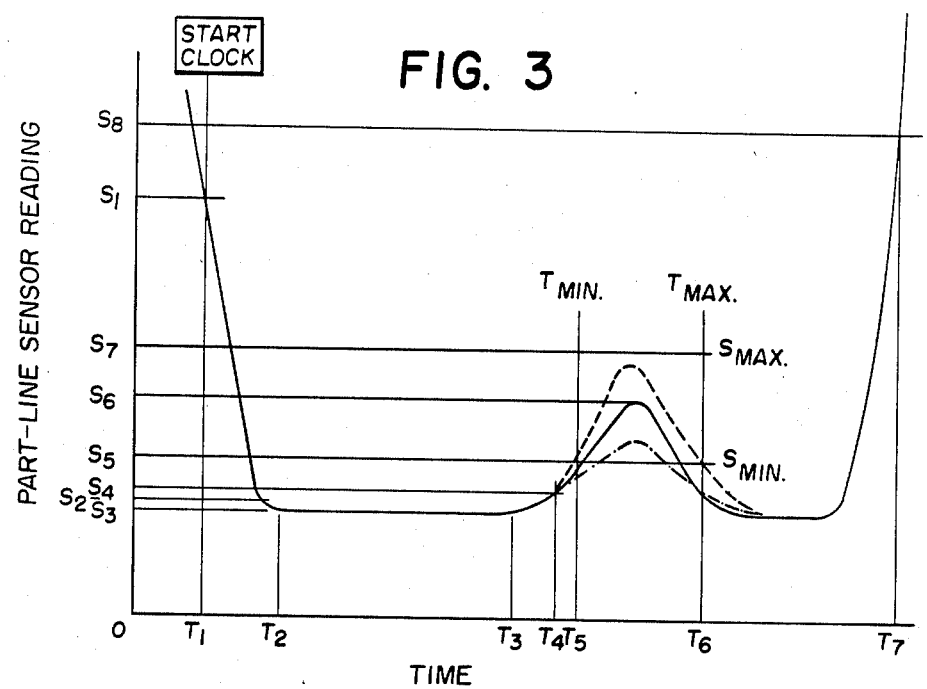
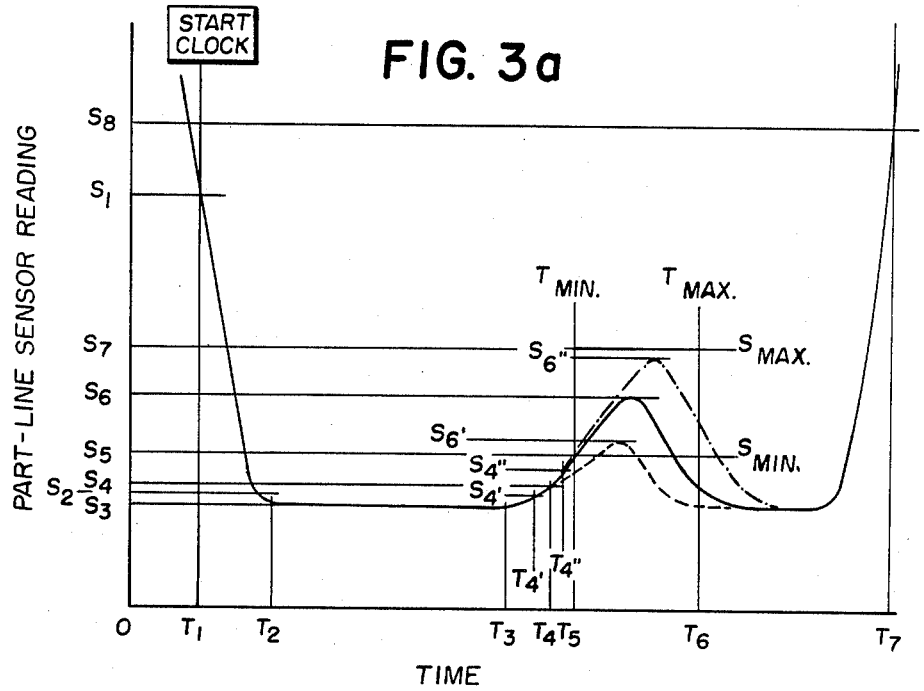

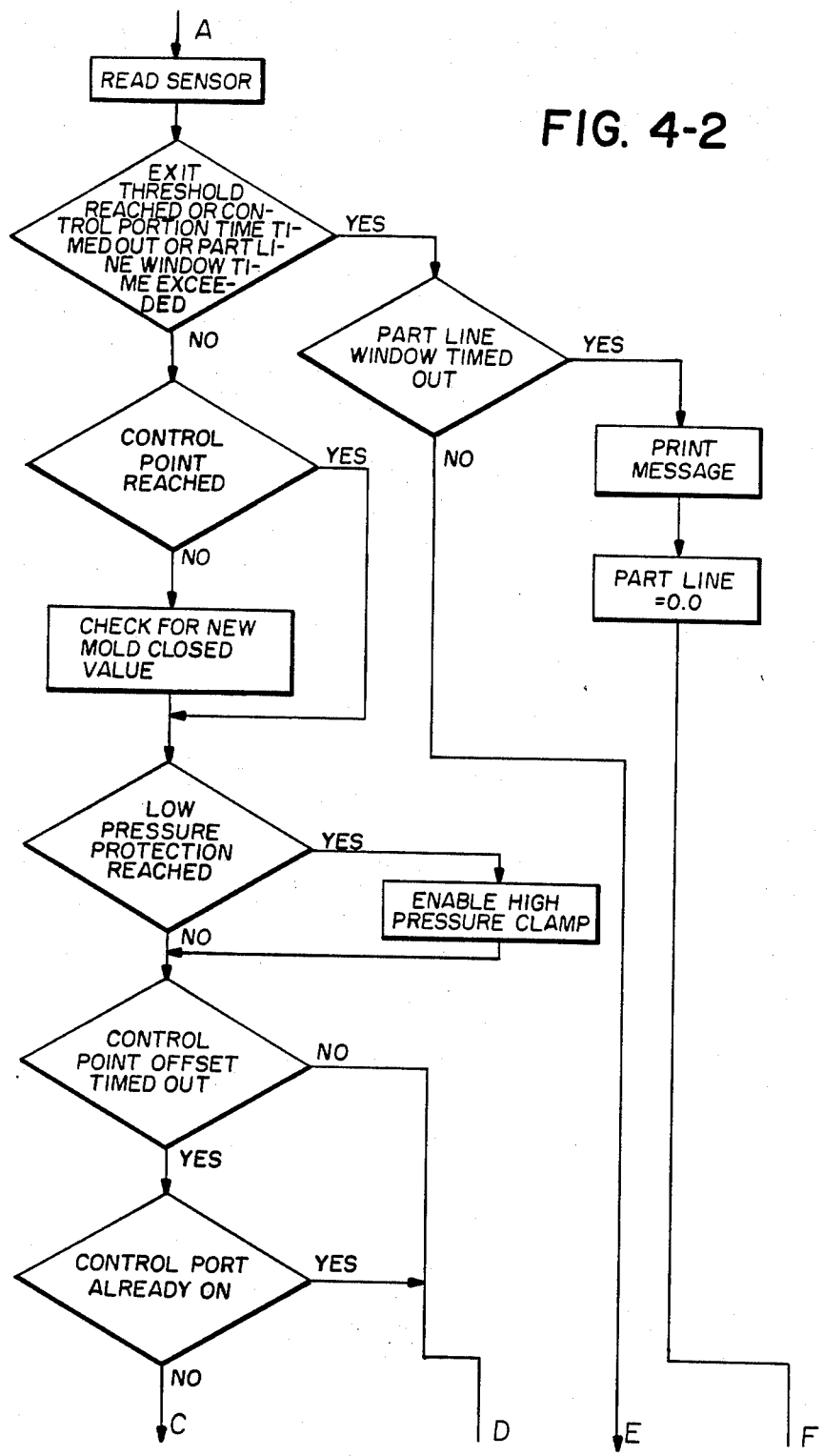

METHOD OF PRECISION VOLUMETRIC CONTROL OF A MOLDABLE MATERIAL IN AN INJECTION MOLDING PROCESS

BACKGROUND OF THE INVENTION

1. Field of the Invention

The present invention is directed to a method of controlling a moldable material in an injection molding process whereby the dimension, weight and stress in the molded article is closely controlled.

2. Description of the Prior Art

The production of consistent and uniform product by the injection molding process has been a long standing objective of the injection molding industry. This objective has become more difficult to achieve as more and more products are produced by this process which are ever increasingly complex and have ever tighter tolerances. The objective has been further complicated by the trend towards fewer and fewer operators associated with the injection molding machines, requiring greater automatic control of the process and apparatus.

A variety of interrelated parameters of the material, machine, and mold must be accomodated by any automated control system for the satisfactory operation of an injection molding apparatus; among these parameters are the type of material being molded, the consistency of the plastic characteristics, the molding cycle time, the machine shot size, melt viscosity and temperature consistency, mold clamp pressure, and injection pressure, among others. It has been found that, as each of these parameters varies during the operation of an injection molding machine, the product uniformity may suffer without constant operator attention.

Many attempts have been made at automatically controlling the injection molding process to produce uniform and consistent product, yet none of the proposed solutions has gained widespread acceptance, at least partially due to the fact that the proposed solutions do not satisfactorily address all of the variables involved.

Among the solutions proposed are those taught by U.S. Pat. Nos. 2,433,132 and 3,976,415 and French Pat. No. 2,527,976 wherein the separation of the mold elements at the part-line is measured and the result utilized to change the machine from the injection phase to a pulsing of the injection ram to maintain the part-line separation constant during the packing and curing of the mold. This system has not been found to be feasible for the manufacture of small, precision parts since it is nearly impossible to so precisely control the pulsing of the ram to pump the microscopic amounts of material necessary to achieve the desired volumetric accuracy of such parts.

Other proposed solutions are exemplified by U.S. Pat. Nos. 2,671,247 and 3,859,400, which teach the control of the switch point of the injection molding machine by sensing the pressure within the mold itself. This system proposes sensing the pressure within the mold to shift the machine from the injection phase to the holding phase while the material cures within the mold. The measurement of the pressure within the mold does not satisfactorily reflect the multiple variables noted above. For example, if the material characteristics are held constant and the machine clamp force is allowed to vary, even if the pressure in the mold cavity remains constant, the part size produced will vary with the clamp force, increasing with reduced clamp force and vice versa. Similarly, with variations in material characteristics, if the viscosity of the material changes, as it may with changes in the injection temperature or with different batches of material, even if the amount of material injected into the mold is substantially constant, the varying viscosity will affect the resistance of the material to being forced into the mold cavity and thus the pressure transmitted into the mold cavity from the injection ram. Accordingly, it will be seen that measuring the pressure in the mold cavity will not truely reflect many of the variables that influence the process and the product.

Another proposed method of controlling injection molding processes is that taught by U.S. Pat. No. 3,940,465 wherein the measurement of the separation of the part-line is utilized to control the cure time of the injection molding cycle. This type of control fails to reflect all of the variables, noted above, which must be accomodated to accurately control part weight and dimension.

U.S. Pat. No. 4,135,873 teaches the measurement of the part-line separation and comparing the separation with a predetermined value and thereafter varying the injection pattern of the injection ram during the following molding cycle. This system does not provide control of the process on a real time basis, reflecting system conditions that are affecting the current cycle. Such a system merely reflects what occurred on the previous cycle, resulting in a tendency for the system to hunt rather than zero into a mode of operation which provides product consistency.

U.S. Pat. No. 4,131,596 teaches the measurement of the part-line separation to reduce the mold clamping pressure upon the measurement of a predetermined separation to minimize any damage to the mold due to flashing of the material at the part-line. This, of course, does not contribute to the control of product weight and dimension.

Japanese Patent Publication No. 11974 of 1978 discloses a method of controlling an injection molding machine wherein the part-line separation is measured and, upon reaching a predetermined reference separation, the machine is switched from a material filling mode to a dwelling mode. The mold separation is then measured and the maximum separation is determined. Thereafter, pressure during the dwell or curing phase of the mold cycle is controlled dependent upon the maximum separation reached to control the final mold separation value at the end of the cure time. Thereafter, the reference separation value for the switch point for the following cycle is changed to accommodate the variations in the machine operation detected during the first cycle. This system of control has the disadvantage that the switch point is determined by the preceeding cycle and thus does not reflect the conditions of the current cycle. This system of control thereafter attempts to adapt to the variations in the molding conditions existing during the current cycle by controlling the holding pressure during the cure phase of the cycle which can adversely affect part weight and density uniformity.

Each of the foregoing control systems has either been too complex and expensive and/or has not provided the requisite control related to all of the variables acting upon an injection molding process.

It has been found that the variables noted above are reflected in the molding process through the part-line opening which also reflects the consistency of the dimensions and weight of the molded product. During repeated molding cycles variations in the product from the molding process can range from under-filled mold cavities (short) to over-filled mold cavities (flashed). The aim point for the process will be somewhere between these two extremes to produce a product which meets the dimensional and weight tolerances established for that process and product. Further, it is known that mechanical and thermal strains are inherent in the molding process which are then transfered to the molded product, sometimes to the detriment of the dimensional stability and life of the product. The mechanical strains are produced by the clamping pressure necessary to hold the mold elements together against the force of the injection of the molten material. The thermal strains occur during the filling and packing of the mold with the high temperature molten material and its effect on the much cooler mold cavity walls, followed by the shrinkage of the material as it cures.

Accordingly, the provision of an injection molding process which accurately controls the dimension, weight, and stress in a molded product without the requirement of constant operator attention would significantly enhance the productivity and applicability of the process, as well as minimize the strain on the molding apparatus and the residual stress in the molded product.

SUMMARY OF THE INVENTION

The present invention provides a method of operating an injection molding machine having a pair of separable mold elements forming a mold cavity therebetween with means for opening and closing the mold elements. Means is provided for introducing a moldable material into the mold cavity at a first pressure and for exerting a second pressure on the moldable material as it cures in the cavity. The method controls the molded article and comprises the steps of closing the mold elements and introducing a moldable material into the mold cavity. The separation of the mold elements is measured during the injection of the moldable material and a predetermined separation of the mold elements is detected. Upon detecting the predetermined separation the pressure is changed from the first pressure to the second pressure and the separation of the mold elements is continued. The cessation of the increase in the separation of the mold elements and a determination is made whether or not the cessation occurs within a predetermined separation window. If the cessation is not within the window a signal is generated to indicate that the cycle has exceeded the product limit. If the cessation is within the window then the cycle is continued and the second pressure is maintained until the moldable material has cured. The mold is then opened.

Still further, the present invention provides a method of operating an injection molding machine having a pair of separable mold elements forming a mold cavity therebetween and arranged for separation along a part-line for the removal of the molded article. Means is provided for opening and closing the mold elements, and injection means is provided for injecting a moldable material into the mold cavity at a first pressure and for exerting a second pressure on the moldable material as it cures in the cavity. The method comprises the steps of closing the mold elements and measuring the separation of said mold elements during the closing of the mold. A predetermined separation of the mold elements is sensed during the closing of the mold and a first timing cycle of a predetermined time length is initiated in response thereto. The termination of relative closing movement between the mold elements is sensed and whether or not the termination occurs during the first timing cycle is determined. The mold elements are reopened if the termination does not occur during the first timing cycle. If the termination occurs during the first timing cycle, a moldable material is injected into the mold cavity at the first pressure. The separation of the mold parting line is measured during the injection of the moldable material and upon detecting a preselected separation the injection pressure is changed from the first pressure to the second pressure. The separation of the mold elements following the changing of the pressure is measured and the cessation of the increase in the separation is sensed. A determination is made whether the cessation occurs within a predetermined separation window and if not a second signal is generated to indicate that the cycle has exceeded the product limit. If the cessation occurs within the window then the cycle is continued and the second pressure is maintained until the thermoplastic material has cured. The mold is then opened and the cured product is ejected.

Various means for practicing the invention and other features and advantages thereof will be apparent from the following detailed description of illustrative preferred embodiments of the invention, reference being made to the accompanying drawings.

BRIEF DESCRIPTION OF THE DRAWINGS

FIG. 3 is a graph illustrating the part-line separation between mold elements during a complete molding cycle;

FIG. 3a is a graph similar to that of FIG. 3 showing an effect of varying the control point of the cycle;

FIG. 4-1 to 4-4 is a logic chart illustrating the operation of the present invention.

DETAILED DESCRIPTION OF THE PREFERRED EMBODIMENT

Figure 1:
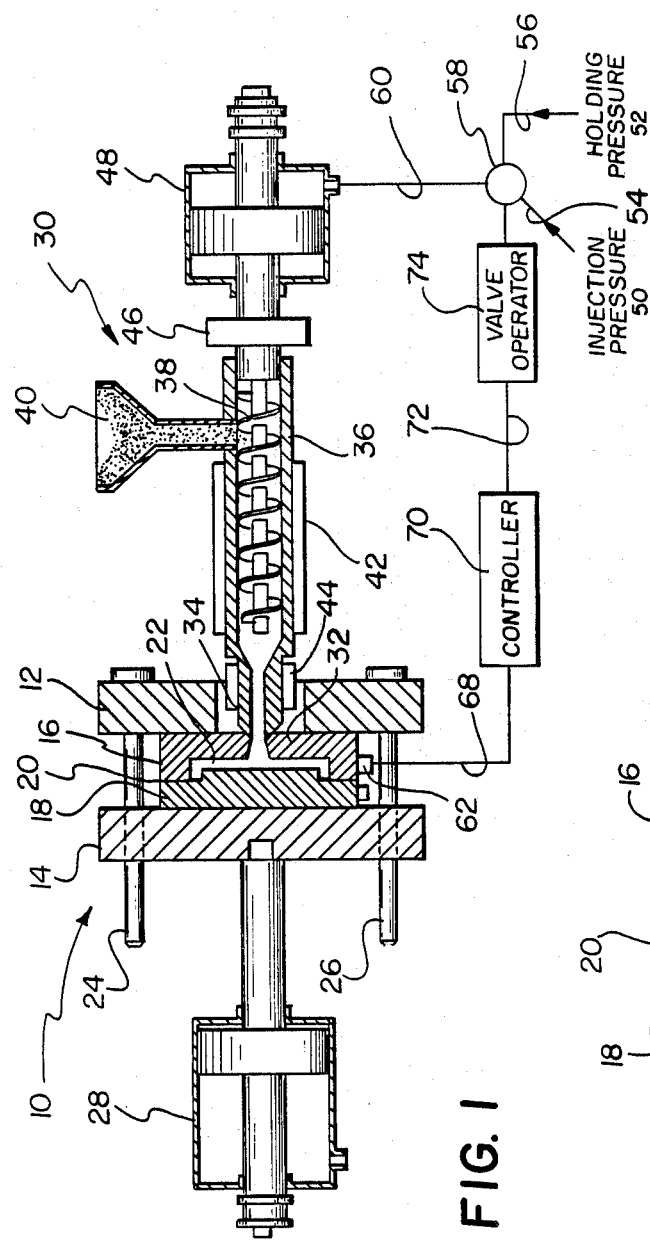
FIG. 1 is an elevation view, partially in section, of an injection molding apparatus adapted for use with the present invention.
Figure 2:
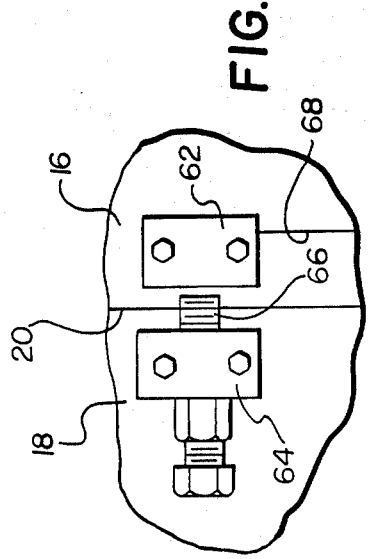
FIG. 2 is an enlarged portion of the part-line between the mold elements showing the mounting of the part-line sensor.

One for of an injection molding apparatus 10 is illustrated in FIG. 1 and comprises a pair of pressure platens 12 and 14 arranged to carry a pair of mold elements 16 and 18, respectively. The mold elements are arranged to meet at a part-line 20 and form a mold cavity 22 therebetween, all in a manner well known in the art. Platen 12 and the mold element 16 associated therewith are stationarily arranged on the machine while platen 14 and mold element 18 associated therewith are movably arranged to be displaced along tie bars 24 and 26 between an open and closed position by a hydraulic cylinder 28.

A plastic extruder assembly 30 is arranged to engage a gate 32 in the mold element 16 with an injection nozzle 34 at the outlet end of the extruder. The main portion of the extruder comprises an extruder barrel 36 having a rotating plasticating screw 38 therein which receives particulate material from a supply 40, and via heat and manipulation plasticates the material for injection through nozzle 34 into the mold cavity 22. To aid in the plastication of the material the extruder barrel is provided with encasing heater elements 42 and 44, in a manner well known in the art. The screw is rotated by a gear 46 driven by a motor, not shown, and is driven longitudinally to inject the molten material into the mold cavity by means of a hydraulic cylinder 48. The hydraulic cylinder 48 is provided with hydraulic fluid from a power source in order to drive the screw longitudinally during the injection process. The hydraulic fluid supply provides both a high pressure for the injection phase of the cycle as well as a low pressure for the holding phase of the cycle, as is well known in the art. One example of such a hydraulic supply comprises two separate sources of high, injection pressure 50, and lower, holding pressure 52 connected by lines 54 and 56 to a control valve 58 which determines which pressure is supplied, by line 60, to the hydraulic cylinder 48.

While a reciprocating screw injection molding machine is illustrated for the purposes of describing the present invention, it will be appreciated by those skilled in the art that other forms of injection molding machines such as plunger and transfer-compression molding machines may also be employed.

A distance sensor 62 is mounted on the stationary mold element 16 adjacent part-line 20. A distance sensor target 64 is mounted on the movable mold element 18 in opposition to the sensor 62. The target may comprise an adjustable bolt or pin member 66 which is arranged to provide the target for sensor 62. The sensor and target are arranged to come into close proximity when the mold elements are closed and clamped but are carefully positioned so that at no time do they contact one another. The sensor element 62 may be of any type known in the art including capacitive, inductive, optical, or other type proximity sensor having a substantially linear output over a range from +10 volts to −10 volts representing a distance range of 0.020 inches. The proximity sensor 62 provides an analog output signal via line 68 to a central processing unit, or controller 70, the operation of which will be described herein below. The controller 70 is arranged to provide an output signal via line 72 to actuate a portion of the molding apparatus, such a valve actuator 74, which is connected to valve 58. Thus, when controller 70 receives the appropriate signal from the proximity sensor 62, it provides an output to valve actuator 74 which switches the valve 58 from the high injection pressure 50 to the lower, holding pressure 52 to thereby control the cycle of the injection molding machine in accordance with the present invention.

It has been found that when an injection molding machine is operated with a sensor sufficiently sensitive to accurately measure the part-line separation between the mold elements 16 and 18, that a characteristic time/displacement (separation) curve is generated for that machine. It has also been found that the part-line separation dimension represented by this curve reflects and integrates the multiplicity of variables operating on the molding machine during the current molding cycle. These variables include mold and machine rigidity, clamp pressure variations, friction and inertia in the mold clamping system, the machine shot size, melt viscosity and temperature consistency, the characteristics of the plastic being molded, and the characteristics of the mold and runner system employed.

Figures 1, 4:
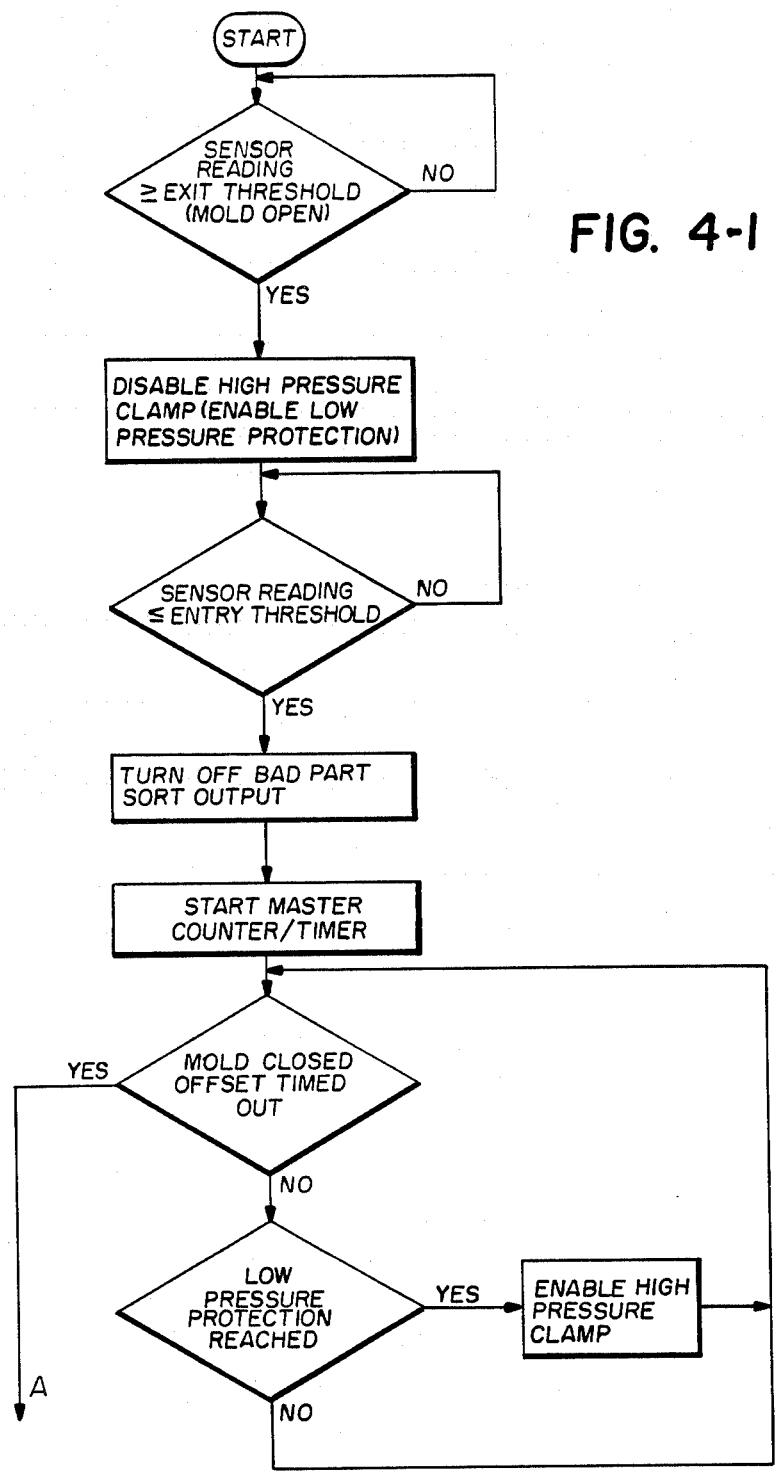
Figures 3, 4:
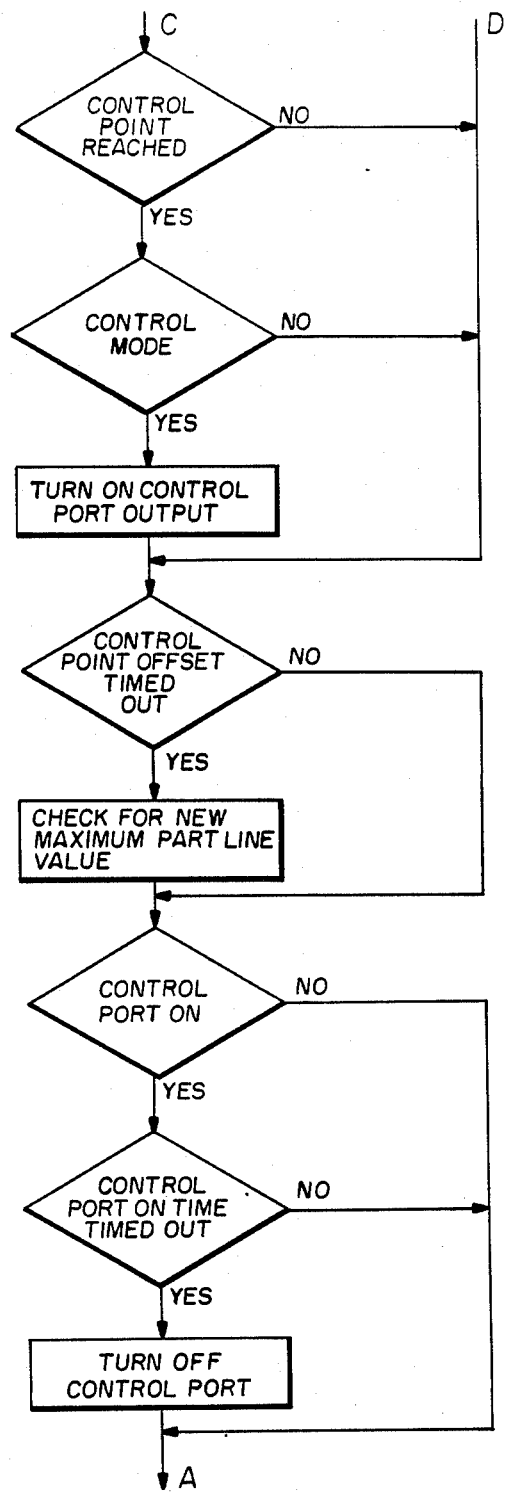
Figure 4:
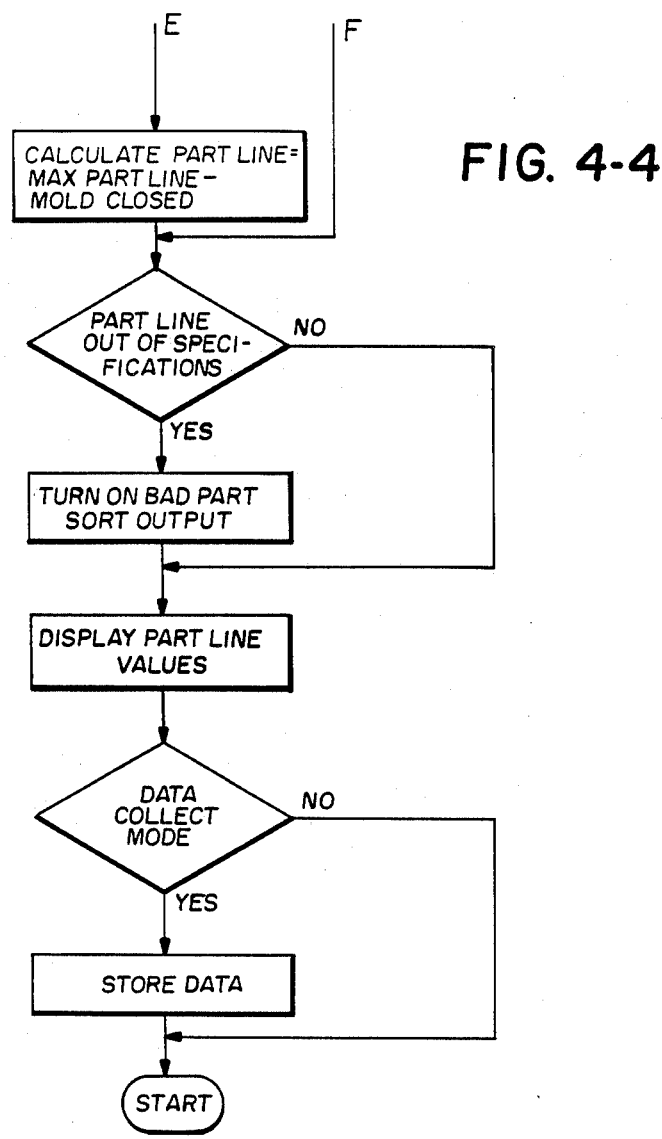

One example of such a time/displacement curve is illustrated in FIG. 3 and will be referred to in the following description of the operation of the present invention in conjunction with the logic chart illustrated in FIG. 4-1 to 4-4. The curve represents the variation of the part-line separation with respect to time during a single molding cycle of an injection molding machine operating at a steady state condition after stabilization following start-up. As the empty mold elements begin to close, the part-line sensor will start to indicate the part-line separation as the mold elements approach each other. As the mold elements approach a predetermined separation $S_1$, which is designated the Entry Threshold, for example a separation of 0.0095 inches, the high pressure clamp system on the injection molding press is disabled, actuating the low-pressure protection portion of the system. As the Entry Threshold is crossed by the continued closing of the mold elements the master counter/timer is actuated at $T_1$ and a "bad part sort" output signal is disabled or turned off. As the mold elements continue to close, the part line separation reaches a "low pressure protection" separation $S_2$ and the machine high-pressure clamp is enabled permitting the high pressure clamping of the mold so that the molten plastic material may be injected into the mold cavity. Thereafter, the timer reaches the mold closed offset point $T_2$, and the part-line separation sensor is read to determine the actual measurement of part-line separation sensed after final closing and clamping of the mold elements at $S_3$. The separation value $S_3$, for example 0.005 inches, is then stored in the controller memory for use later in the program. After it is determined that the mold elements have been clamped together, the injection of the molten material into the mold cavity is initiated with the injection ram 30 operating under the high injection pressure 50. As the mold fills during the time from $T_2$ to $T_3$, the part-line separation value remains substantially constant at $S_3$ until the molds have been filled and the injection ram begins to pack out the mold. At this time $T_4$, the mold elements begin to separate along the part-line. When the part-line separation reaches a predetermined Control Point $S_4$, a control signal is delivered to the valve operator 74, switching valve 58 from the high injection pressure 50 to the lower holding pressure 52.

Thereafter, because of the finite lag in the signal activating the valve 58 and the injection ram responding to the change in pressure, as well as other inertial factors in the operation of the machine, the part-line separation will continue to increase until it reaches a maximum $S_6$. At that point the material in the mold will begin to cool and shrink and the part-line separation will fall back to approximately the initial mold closed separation $S_3$ during the curing or cooling phase of the molding cycle. Thereafter, the mold will be opened and the part ejected and the sensor will indicate that the part-line separation has exceeded the Exit Threshold $S_8$. When the maximum part-line separation value $S_6$ is detected and measured, the part-line value is calculated by subtracting from the maximum part-line separation $S_6$ the mold closed separation value $S_3$ giving a part-line separation value for each part produced by the mold. Inasmuch as the mold closed separation value is determined for every cycle, variations in the performance of the machine is accommodated by rezeroing the mold closed value for every cycle of the machine.

Examples of other part-line separation curves occurring on the illustrative machine are also illustrated in FIG. 3 as dotted and dash-dot lines. These curves illustrate variations in the part-line that may occur because of variables acting upon the overall system. For example, should some minor change slightly reduce the clamping pressure during a given molding cycle, the maximum part-line separation might increase as illustrated by the dotted line. So long as the increase in part-line separation does not exceed the operator-selected maximum separation $S_7$, then the part produced will still be considered acceptable. Likewise, should the mold clamp force, as an example, be increased during a mold cycle, the final part-line separation would be reduced as illustrated by the dash-dot line. Again, so long as the final part-line separation is above the operator-selected minimum separation $S_5$ the part will be considered acceptable. On the other hand, should the maximum part-line separation achieved fall outside the maximum and minimum part-line separation values selected by the operator, then a "bad part sort" output signal will be generated by the controller which may be utilized by the system or by the operator to identify or remove the out-of-specification part.

The process is initiated after the sensor has been installed in the molding machine and the controller wired to the appropriate controlling portion of the machine. The injection molding machine is then operated by a competent operator to produce acceptable parts. During this operation the controller is set to the "monitor mode" whereby part-line separations are measured and monitored with appropriate data being retained in the controller memory. Appropriate adjustments are made to the process by the machine operator to achieve satisfactory molded parts. As the satisfactory parts are identified, the part-line separation measurements made for those satisfactory parts are utilized to determine the desired predetermined control point as well as the maximum and minimum part-line separations to be used for controlling the process. At the same time, the appropriate time offsets are also being selected by the operator according to the particular characteristics of that individual machine. As soon as sufficient data has been collected to ensure the operator that the sampling is representative, and the values have been set into the controller, the controller may be switched to the "control mode" wherein it commences the control of the injection molding process.

Referring now to FIG. 3a wherein a part-line separation graph similar to that of FIG. 3 is illustrated, the effect of varying the selection of the control point is illustrated. For example, should a lower control point $S_4'$ be selected, occurring at an earlier time $T_4'$, the resulting part-line separation following the control point would be as represented by the dotted line and would result in a lower maximum part-line separation $S_6'$. As illustrated, should such a lower control point be selected, the part produced would still fall within the preselected maximum/minimum and thus fall within the acceptable part quality window with a finite reduction in the material utilized to produce the acceptable part. This provides an incremental saving in the quantity of material required to produce satisfactory parts. At the same time, it will be noticed that the cycle time could also be shortened, if desired, while still producing satisfactory parts. On the other hand, if a control point $S_4''$ is selected which is greater than that previously utilized, the resulting part-line separation following the control point would be represented by the dash-dot line and the maximum part-line separation $S_6''$ would be increased. Thus, the operator has the option of increasing or decreasing the average part size and weight by simply adjusting the preselected control point.

Figure 5:
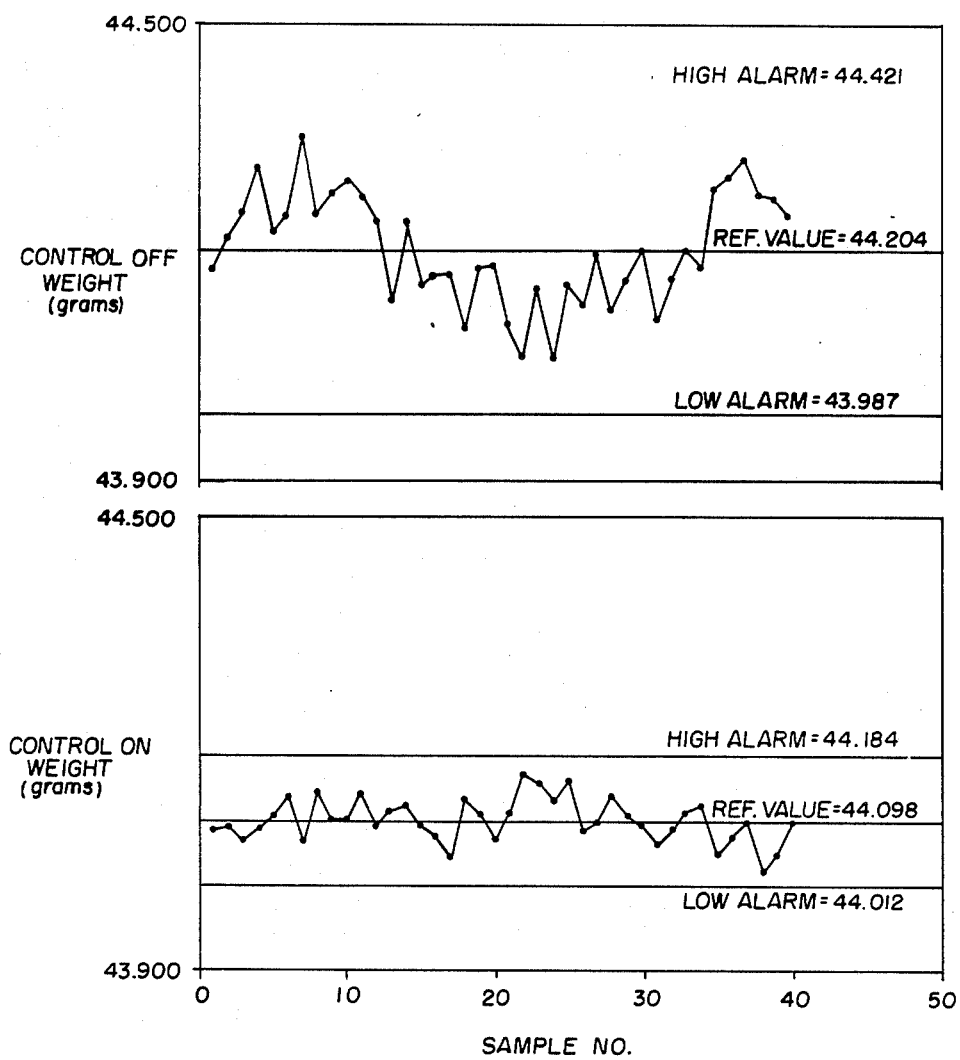
FIGS. 5 and 6 are graphical illustrations of the improved process control provided by the present invention.
Figure 6:
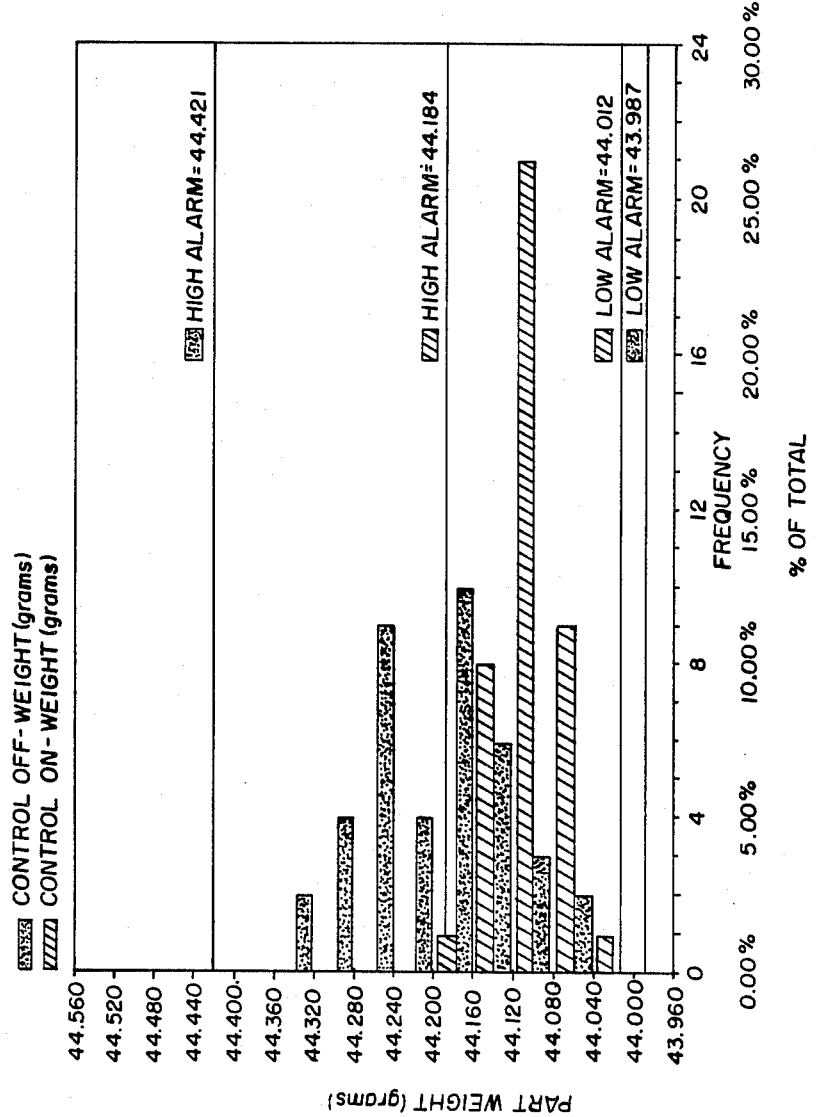

The effect of such control is illustrated in the graphs shown in FIGS. 5 and 6, wherein the part weight measured during a series of molding cycles is plotted. In the upper portion of FIG. 5, the part weight measured on parts produced with the control aspect of the present invention turned off is illustrated and shows a wide variation in part weight achieved. In the lower portion of FIG. 5, the control feature of the present invention has been employed and is controlling the molding machine. This shows a significant reduction in variations in part weight. The frequency and percentage of total parts falling within a particular part weight category is then illustrated for the same parts as illustrated in FIG. 5 in FIG. 6. It is readily apparent that the part weight consistency of the controlled machine output is significantly improved. The average size can also be slightly reduced since the assurance of consistency and repeatability of part size and weight provided by the present invention allows for the reduction of mean-part weight. The operator need now only use that amount of raw material required to achieve the smallest statistically acceptable product resulting in additional material savings. for a material savings while still remaining above the minimum part weight determined for the uncontrolled operation of the machine.

The various timing offsets (e.g., $T_2$ and $T_3$ in FIG. 3) provided by the present system permits an operator to select the appropriate timing intervals appropriate to that particular machine. Moreover, the timing offsets also function as blanking signals to limit the reading of the part-line separation sensor to the appropriate period in the cycle. Thus, any vibration or jitter present in the machine that occurs during the blanked portions will not provide spurious part-line separation signals that could adversely affect the overall machine control.

Further, the present invention provides a number of protective features for the molding machine. One of these is the low pressure protection portion of the program whereby the controller disenables the machine high pressure clamp system until the satisfactory closing of the mold is assured. Thus, if a part from a previous cycle has been retained between the mold elements, the machine is prevented from clamping down on this retained part and possibly damaging the molds. Similarly, the system is adapted to sense any plugged gates which will prevent the filling of the mold. Still further, by the system provided, "oil canning" of the molds can still be accommodated while providing measurement of part-line opening to determine part weight.

Still further, the use of the present invention can be helpful to a machine operator to achieve machine start-up after shut-down, such as for changing molds. Typically, it has been found that utilizing the present invention initial machine start-up time has been reduced by up to 80%. Also, it has been found that with the present invention it is possible to mold satisfactory parts at lower clamp pressures than previously required for a given machine. This not only reduces operating costs for the machine, but also extends the life of the machine and permits the manufacture of some parts on lower tonnage machines than were previously thought possible.

Accordingly, the present invention provides method and apparatus for controlling an injection machine and process by using the measurement of the separation of the mold elements as a verification of achieving product quality. The control and measurement of the part-line separation assures part completion as well as part uniformity and quality. The present invention provides verification that all of the variable parameters in the molding machine and process are combining to achieve the specified part. Because of the improved product quality provided by the present invention, reductions in part rejects of as much as 98% have been achieved. This results in improved costs by minimizing the amount of material regrind necessary as well as the improved quality raw material from reduced regrind. With a reduction in rejects also comes a reduction in labor. Still further, older molding machines are capable of producing higher quality products with reduced labor increased flexibility permitted by frequent mold and process changes while still providing the requisite product quality.

The invention has been described in detail with particular reference to a presently preferred embodiment, but it will be understood that variations and modifications can be effected within the spirit and scope of the invention.

What is claimed is:

1. In a molding method utilizing a molding machine having a pair of separable mold elements forming a mold cavity therebetween, means for opening and closing the mold elements, and means for introducing a moldable material into said mold cavity at a first pressure and for exerting a second pressure on said moldable material as it cures in said cavity; the method of controlling the molded product comprising the steps of closing said mold elements, introducing a moldable material into said mold cavity, measuring the separation of the mold elements resulting from the introduction of the moldable material into the mold cavity, detecting a predetermined separation of said mold elements, changing the pressure from said first pressure to said second pressure in response to said detection, measuring the separation of the mold elements following changing the pressure and sensing when the separation of the mold elements stops increasing, determining whether the cessation of mold element separation increase occurs within a predetermined separation window and if not within said window generating a signal to indicate that the cycle has exceeded the product limit, if said cessation occurs within said window then continuing the cycle and maintaining said second pressure until the moldable material has cured, and opening said mold elements.

2. The method according to claim 1 wherein said signal activates an alarm.

3. The method according to claim 1 wherein said signal stops the molding cycle and opens said mold elements.

4. In an injection molding method utilizing a molding machine having a pair of separable mold elements forming a mold cavity therebetween and arranged for separation along a parting line for the removal of the molded article, means for opening and closing the mold elements, and injection means for injecting a moldable material into said mold cavity at a first pressure and for exerting a second pressure on said moldable material as it cures in said cavity, the method of controlling the dimension, weight and stress in a molded article comprising the steps of closing said mold elements, measuring the separation of said mold elements during the closing of the mold elements, sensing a predetermined separation of said mold elements during the closing of the mold and initiating a first timing cycle of a predetermined length in response thereto, sensing the termination of relative closing movement between said mold elements and determining whether or not said termination occurs during said first timing cycle and if not within said timing cycle generating a first signal to indicate that said mold elements have closed outside said first cycle, if said termination occurs during said timing cycle injecting a moldable material into said mold cavity at said first pressure, measuring the separation of the mold elements during the injection of the moldable material, detecting a predetermined separation of said mold elements, changing the injection pressure from said first pressure to said second pressure upon detecting said predetermined separation, measuring the separation of the mold elements following changing the pressure and sensing when the separation of the mold elements stops increasing, determining whether the cessation of mold element separation increase occurs within a predetermined separation window and if not within said window generating a second signal to indicate that the cycle has exceeded the product limit, if said cessation occurs within said window then continuing the cycle and maintaining said second pressure until the thermoplastic material has cured, and then opening said mold and ejecting the cured material.

5. The method according to claim 4 including the step of generating a reference signal representing the closest proximity of the mold elements upon sensing of the termination of relative closing movement between said mold elements.

6. The method according to claim 5 including the step of utilizing said reference signal as a comparison for further separation measurements during that molding cycle.

7. The method according to claim 4 including the step of interrupting the molding cycle and opening said mold elements upon the generation of said first signal.

8. The method according to claim 4 including the step of interrupting the molding cycle and opening said mold elements upon the generation of said second signal.

* * * * *